June 29, 1937.　　　R. L. WILLIAMS　　　2,085,056
SUBMARINE SIGNALING APPARATUS
Filed Oct. 31, 1929
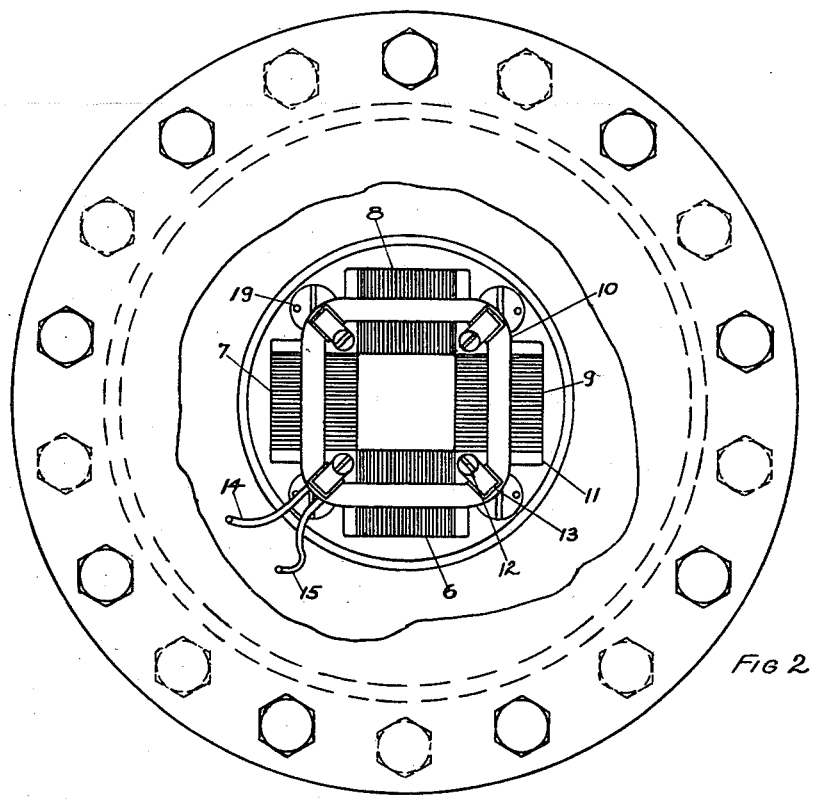
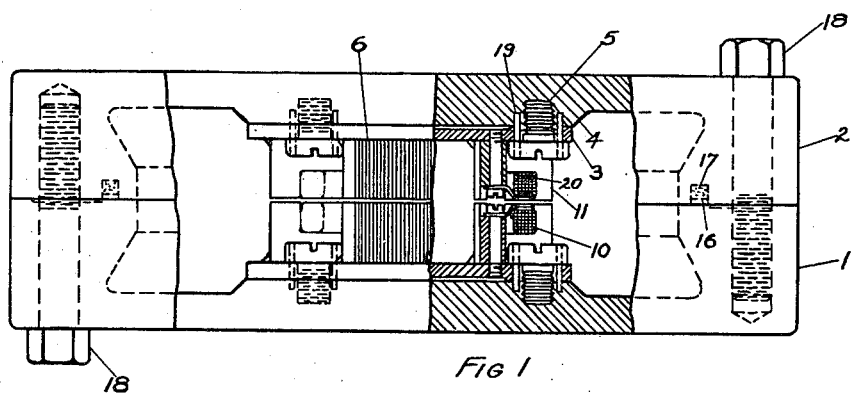
INVENTOR
ROBERT L. WILLIAMS
By
Ezekiel Wolf
ATTORNEY

UNITED STATES PATENT OFFICE 2,085,056

SUBMARINE SIGNALING APPARATUS

Robert Longfellow Williams, Newton, Mass., assignor to Submarine Signal Company, Boston, Mass., a corporation of Maine Application October 31, 1929, Serial No. 403,812

9 Claims. (Cl. 177—386)

The present invention concerns submarine sound producers, and in particular, submarine sound producers of the oscillator type.

Among the different types of oscillators, some are operated electromagnetically and some electrodynamically. Both of these types may have amplitude transformation mechanism, if desired, or may be of the type described in my Patent No. 1,677,945, issued July 24, 1928, in which there is no amplitude transforming means and the forces act directly on the diaphragm.

In the present application, the oscillator is of the type described in my patent mentioned above, but has a number of improvements in construction over the prior art which make it superior to the type of device previously used.

In prior oscillators of the type shown in my Patent No. 1,677,945, some used laminated pole pieces and armatures, while in others the armatures and pole pieces were shaped of the same piece as diaphragms, and therefore not laminated. The non-laminated structures were less efficient electrically than the laminated structures; therefore, the latter have been adopted generally. The laminations are secured together preferably by welding or brazing them at points or along edges farthest from the place where the greater portion of the magnetic flux flows. In structures of the type herein described, it was usual to weld or braze the laminations together and also to the diaphragm. This construction has been effectively used in uniting steel diaphragms and laminated armatures and pole pieces.

However, I have discovered that while this system and construction works well with the ordinary steel diaphragm, with the diaphragms of stainless, rustless or non-corrodible steel, the diaphragms do not stand up as well as the same kind of a diaphragm in which the laminations are not welded or brazed thereto, as, for instance, in electrodynamically operated oscillators having a copper driving tube.

This I believe is due to the fact that the brazing or welding furnishes heat enough either to change slightly the crystalline structure of the steel or to rearrange its internal construction so that the diaphragm is not in the same condition as it was previously.

In order to correct this fault, I braze the laminations to a steel plate and then mount the steel plate on the diaphragm without the application of heat. In this way, not only the structure of the diaphragm is unchanged, but also its acoustic characteristics.

Another feature of the present invention is the division and balance of the magnetic circuit. In the prior art double diaphragm oscillators have been used, but in most cases the two halves were not alike, or an additional element or elements were needed to drive the diaphragms or hold the coils containing the current, as the case may be.

In the present device by the symmetry of the two halves and the elimination of any additional elements, I am able to obtain an oscillator of far superior construction, easier to manufacture or repair, and possessing a higher efficiency, a greater output of power for the weight than any oscillator previously constructed.

In the present device, I also employ a method of holding the two halves of the oscillator together which insures a rigid connection of the same and thereby eliminates power losses and wear of the parts.

These advantages and others will be described more in detail in connection with the following description and drawing in which:

Figure 1 shows a sectional view of the device; and

Figure 2 is a plan view with a portion removed.

In Figure 1, the oscillator is shown as constructed of two halves 1 and 2. These halves are substantially similar and have a heavy rim and a thinner central portion, recessed on the inner side forming the main portion of the diaphragm. At the center of the diaphragm is a portion 4 bossed slightly on the inner side. Both halves of the oscillator are formed of stainless, rustless or non-corrodible steel. Resting against the surface of the portion 4 is a plate 3 which is slightly undercut within an outer annulus on the plate 3. The plate 3 is held in place by means of the machine screws 5 which are pinned in place by the pins 19 to prevent loosening on account of vibration. To the plate 3 is welded or brazed the laminated blocks 6, 7, 8 and 9 in which the coil 10 rests. In construction, the blocks 6, 7, 8 and 9 are first welded to the plate 3 and the plate is then fitted on the diaphragm. In fact, a new plate unit having the coil 10 and the blocks may be substituted if the coil has gone bad without sending the oscillator back to the repair shop. The laminated blocks are supported at their ends by angle pieces 11 and the coil 10 is held in place by the screws 12 and the clamping piece 13. Current is conducted to the coil 10 of the oscillator by the leads 14 and 15, and to coil 20 by similar leads. The two coils may be connected in series or parallel to suit the voltage of the current supply.

It will be noted that the two halves of the oscillator are just alike, with the exception of a tongue 16 being provided in one part and a groove 17 in the other part, the groove being filled with material to make the oscillator watertight. In this manner, there is no internal mechanism within the oscillator and should a part of one half go bad, a new half may be substituted for it.

To insure a rigid connection of the two halves of the oscillator, not only to make the oscillator watertight, but to have a unified outer rim for the diaphragms to work against, the halves are bolted together by the bolts 18, which alternately thread one on one half and the next in the other half.

It will be observed that the arrangement of the bolts provides a simple means of holding both plates symmetrically in relatively the same manner. Furthermore, the bolt heads are so distributed that the bearing surfaces furnish approximately the same pressure contact in relatively the same position and therefore balance the structure as it should be balanced in a device of the type described which vibrates on both surfaces.

The structure above described has particular utility in the art of submarine signaling and its efficiency and utility have been proved in actual manufacture and operation. An oscillator of the type described has a weight far less than the weight of oscillators previously known in the art and at the same time is capable of producing a substantially greater amount of power with a high degree of efficiency.

The bossed portion 4 which is formed on the inner sides of the diaphragms not only serves to thicken the central portion of the radiating element and thus provide more material into which the bolts or screws 5 may be threaded but also has a further utility in stiffening this portion of the radiating element so that the plate 3 which is fastened to it and to which the laminations are welded is not subjected to any shearing or friction action between the elements of the laminations themselves. By stiffening the central portion of the diaphragm it is also made to operate more like a piston diaphragm, particularly in its central portion, so that there is substantially no shearing action between the base 3 on which the laminations are mounted and the surface of the boss and the tendency, therefore, is for the screws 5 to remain in position and not work loose on their threads, thereby eliminating mechanical friction and resulting losses.

It will also be observed that the bearing surface between the plate 3 and the bossed portion of the diaphragm is in the form of a ring or the like, one of the parts being undercut with respect to the other. While this construction is not absolutely essential, it has the advantage of limiting the area of contact to an area which uniformly surrounds the center of the diaphragm and at some distance away from the center of the diaphragm as well as substantially restricting the area of contact to that in which the plate is rigidly held by the screws 5 against the diaphragm. The friction between the plate and the diaphragm is thereby reduced to a minimum and, furthermore, the force acting between the armatures is all applied to the diaphragm along an annulus of fairly large diameter. Any irregularities in the distribution of the force between the armatures is thereby smoothed out so that there is less tendency for the force applied to the diaphragm along a diameter to be unbalanced. This undercut construction is also of utility in the manufacture of the oscillator since it reduces the area of the contact surfaces which must be accurately machined whereby the cost of manufacture is substantially reduced.

While the construction which has been described is of particular advantage where the diaphragms are formed of non-corrodible steel, it is also of considerable utility where ordinary steel diaphragms are employed since the present construction is substantially cheaper to manufacture and results in a more efficient oscillator than the constructions heretofore employed.

Having now described my invention, I claim:

1. A submarine oscillator including two opposed diaphragms, means provided at the edge of the diaphragms for clamping said diaphragms together including a plurality of bolts, some threading into said means on one side and others on the other alternately.

2. A submarine oscillator including two opposed diaphragms provided with heavy outer rims forming a part thereof and means for bolting said diaphragms together comprising a plurality of bolts positioned uniformly about said rims and alternately threading into one and then the other.

3. A submarine oscillator comprising two opposed diaphragms having heavy outer rims adapted to form an entirely enclosed casing, said diaphragms having a central boss section, a plate positioned to abut said boss section, electrical means for producing mechanical oscillations mounted on said plates and means for bolting said plates to the boss portions near the periphery of said plates.

4. A submarine oscillator including a diaphragm having a central bossed section, a plate positioned to abut said central bossed section and carrying a part of the electrical driving means for operating the oscillator and means for bolting said plate at its periphery to the bossed portion of said diaphragm.

5. A submarine oscillator including a diaphragm having a central bossed section, a plate having an inner undercut section, said plate positioned to abut said central bossed section and carrying a part of the electrical driving means for operating the oscillator and means for bolting said plate at its periphery to the bossed portion of said diaphragm.

6. A submarine oscillator comprising two opposed diaphragms having heavy outer rims adapted to form an entirely enclosed casing, said diaphragms having a central boss section, a plate positioned to abut said boss section, electrical means including a group of laminations forming an electromagnet welded together to said plate for producing mechanical oscillations, and means for bolting said plates to the boss portions near the periphery of said plates.

7. A submarine oscillator including a diaphragm formed of non-corrodible steel and having a central bossed section, a plate of ordinary steel, electromagnet core forming laminations welded to said plate and means for bolting said plate to the bossed portion of the diaphragm.

8. A submarine oscillator comprising two opposed diaphragms of non-corrodible steel and having heavy outer rims adapted to form an entirely closed casing, each of said diaphragms having a central bossed section, a plate of ordinary steel positioned to abut each of said bossed sections, electromagnet core forming laminations welded to said plates and means for bolting said plates to the bossed sections of said diaphragms.

9. A submarine oscillator comprising two opposed diaphragms of non-corrodible steel and having heavy outer rims adapted to form an entirely closed casing, each of said diaphragms having a central bossed section, a plate of ordinary steel positioned to abut each of said bossed sections, electromagnet core forming laminations welded to said plates and means for bolting said plates to the bossed sections of said diaphragms near the periphery of said plates.

ROBERT LONGFELLOW WILLIAMS.